Feb. 28, 1939.  F. A. FRITZSCH  2,149,014
SPEED CHANGING MECHANISM
Filed Sept. 30, 1937   5 Sheets-Sheet 1

Feb. 28, 1939.  F. A. FRITZSCH  2,149,014
SPEED CHANGING MECHANISM
Filed Sept. 30, 1937  5 Sheets—Sheet 3

Feb. 28, 1939.  F. A. FRITZSCH  2,149,014
SPEED CHANGING MECHANISM
Filed Sept. 30, 1937   5 Sheets-Sheet 4

INVENTOR:
Frank A. Fritzsch
by R. H. Herbert
His Attorney

Feb. 28, 1939.  F. A. FRITZSCH  2,149,014

SPEED CHANGING MECHANISM

Filed Sept. 30, 1937  5 Sheets-Sheet 5

INVENTOR:

Patented Feb. 28, 1939

2,149,014

UNITED STATES PATENT OFFICE 2,149,014

SPEED CHANGING MECHANISM

Frank A. Fritzsch, Cincinnati, Ohio, assignor to The Lodge & Shipley Machine Tool Company, Cincinnati, Ohio, a corporation of Ohio Application September 30, 1937, Serial No. 166,626

46 Claims. (Cl. 82—26)

My invention is exemplified in the feeding mechanism of a metal turning lathe for effecting the feeding of the tool by means of a feed screw, also known as a lead screw, or a feed rod, or both, which have selective operative connections with the usual apron mechanism of the usual tool carriage for feeding the carriage or cross-slide, or other tool support. The lead screw is usually employed when accurate advances of the tool with relation to the rotations of the work are to be obtained, as in cutting threads, cams and the like, and the feed rod is usually employed when cutting plain, cylindrical or tapered surfaces, or performing other work in which the distance of feed per revolution of the work, or for a given measured axial distance, as an inch, is governed by the cutting resistance between the tool and the work, or the fineness of work desired, the feed rod coacting with the usual rack extending lengthwise of the bed when feeding the carriage along the bed.

The calculations prevalent in practice in the United States when cutting threads is to designate the axial measurement of threads as a given number of threads per inch, and such practice is, further, to arrange the numbers of threads as advancing numbers on the indexes of lathes in which the threads are cut, as, for instance, 2, 4, 6, etc. threads per inch; and it is the practice when cutting advancing or retreating surfaces, to designate the inclination as equal to a subdivision of a measure of length or multiples thereof, for instance, in thousandths of an inch, when such designations are more desirable.

Comparing such decimal measurements with the number of threads per inch, it will be noted that the smaller the number of threads per inch the greater are the number of thousandths of an inch which a tool must travel to cut an inclined surface equal to the instanced thread, and if such subdivisions of decimal measurements, representing leads, were to be placed on an index of leads opposite to the index of threads, then the column of leads would appear in decreasing order, whereas the column of threads would appear in increasing order.

It is more convenient and a factor in reducing errors for operators to view columns of threads and leads in the same numerical order, namely, from lower to higher, and it is one of the objects of my invention to provide novel means in the feed changing mechanism to reverse the order of resultant lead values so that an index may be provided on which the feed values of different kinds or characters, for instance, threads and leads, may be arranged in numerals of increasing value in similar directions.

It is the object of my invention, further, to provide novel means whereby the operator is advised of the character of set-up in the feeding mechanism, as, for instance, whether it is for threads or for leads; and, further, to provide novel means whereby such means to advise the operator are operatively associated with the means for accomplishing such change in set-up.

Such characters of feeds, as for threads and leads, must usually be very accurate and are instanced as obtained primarily by operation of the lead screw. Tool advances by the feed rod represent another character of feed and are herein designated feeds, and in my improved device the designations of such feeds are associated with the designations of threads, so that the operator may be advised of such designations of feeds, representing feed values obtained by operation of the feed rod, in connection with the designations of threads, obtained by operation of the lead screw.

It is the object of my invention, further, to provide novel mechanism whereby to translate the advancing values of the tool into metric measurements or other module values for different kinds or systems of feeding.

It is the object of my invention, further, to provide novel means whereby the designation of the set-up in any given system, for instance, a visual designation, is associated with interference means in the transmission mechanism, to prevent any set-up in the transmission mechanism other than that shown in the designating means; further, to provide a novel association of reversing mechanism for the feeding movement of the tool and a novel arrangement of selective feeding means acting in novel manner upon the respective set-ups in the feeding mechanism; further, to provide novel means for making such changes in the set-ups in the feeding mechanism; and, further, to provide novel means for indicating the same associated in novel manner with the speed changing mechanism.

It is the object of my invention, further, to provide novel means for effecting speed change in a group of gears and tumbler mechanism; and, further, to provide novel means for effecting speed change in auxiliary speed changing means, and interlocking means for the latter.

My invention consists in novel means for accomplishing the various objects stated; further, in novel means for reversing the direction of power transmission through a group of gears and tumbler mechanism; further, in novel means to indicate such reversal; further, in operatively connecting such indicating means with an element of such reversal means; further, in novel means for axially and angularly moving the tumbler of a group of gears and tumbler mechanism; further, in novel speed changing means; and, further, in novel interlocking means for the same.

My invention consists, further, in providing a novel group of gears and tumbler mechanism including means for axially moving a speed change element thereof and means for angularly moving the same; and, further, in locating the operating means in a closed feed box serving as a lubricant reservoir and having handles at the outside thereof for manipulating such operating means inside the feed box for such respective axial and angular movements, whereby slots such as heretofore employed for tumbler arms and other exposed openings in the feed box are avoided to prevent the entrance thereinto of chips, dirt and other deleterious substances.

My invention consists further in providing novel means whereby a plurality of characters of feeding is obtained by rotating the group of gears and tumbler gearing in opposite directions and arranging the feed resultants of the respective characters groupwise on an indicator having operative connection with the speed changing element of the group of gears and tumbler mechanism for operating the latter in accordance with movements in the indicator to indicate corresponding tool movements; further, in providing a character indicator having operative connection with a direction control member for the group of gears and tumbler mechanism to synchronize said indicator and said member; and, further, in providing a transmission control member to control transmission selectively from the group of gears and the tumbler mechanism having operative connection with said direction control member to synchronize the same.

My invention consists, further, in providing novel operatively connected indexing and operating means for the tumbler mechanism; further, in providing novel relation of speed changing means and indexing means for the same; further, in providing novel speed change means for the group of gears and tumbler mechanism, and between the latter and the object fed, to qualify the feeding speed when reversing direction of transmission through the group of gears and tumbler mechanism in order that the resultant feeds of different values are consolidated within a narrower band; and further, in placing such resultant feeds as an index in association with an operating part effecting speed change.

The invention will be further readily understood from the following description and claims, and from the drawings, in which latter:

The invention is shown embodied in the feed transmission of a lathe arranged to move the tool, gaged by different characters of denominations, designated in the present instance as threads, feeds and leads. The bed of the lathe is represented at 21, the headstock at 22, the feed screw at 23, and the feed rod at 24. The feed screw is arranged to be connected with the usual half nut mechanism in the apron of the carriage, and the feed rod is arranged to be operatively connected with the usual gearing in the apron connecting with the usual rack 25 extending lengthwise of the bed for feeding the carriage lengthwise of the work and, in usual manner, with the usual cross slide on the carriage for cross movement of the tool. The present invention relates, however, primarily to the feeding movement of the tool lengthwise of the work.

The speed changing mechanism is exemplified as driven from the usual spindle 27, (Figs. 1, 2 and 3), journaled in the headstock, but may have any other desirable source of power. The spindle is rotated by any suitable means at various speeds, in forward or reverse directions, such means not being herein shown or described, although a suitable means for rotating the spindle is shown, described and claimed in my copending application for patent on improvement in Speed changing mechanism, Serial No. 155,072, filed July 22, 1937.

Figure 1:
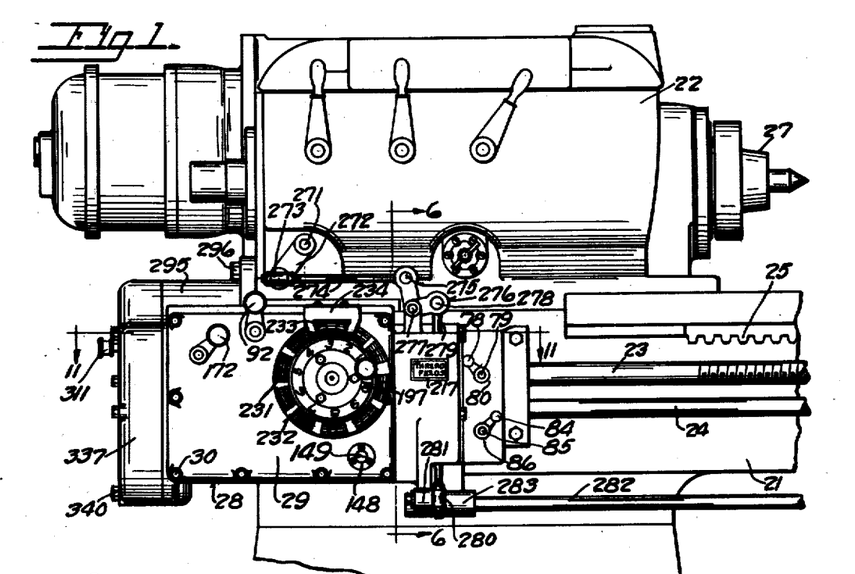
Fig. 1 is a front elevation of the head end of a lathe, partly broken away, and embodying my invention.
Figure 2:
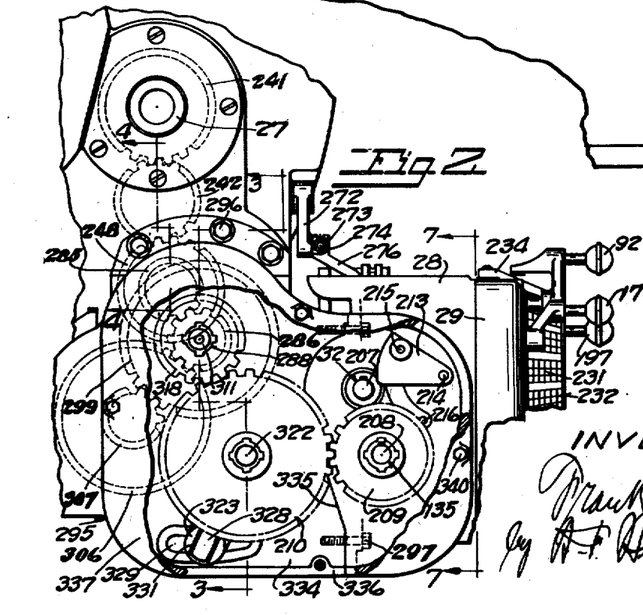
Fig. 2 is a head end view of the same, partly broken away.
Figure 7:
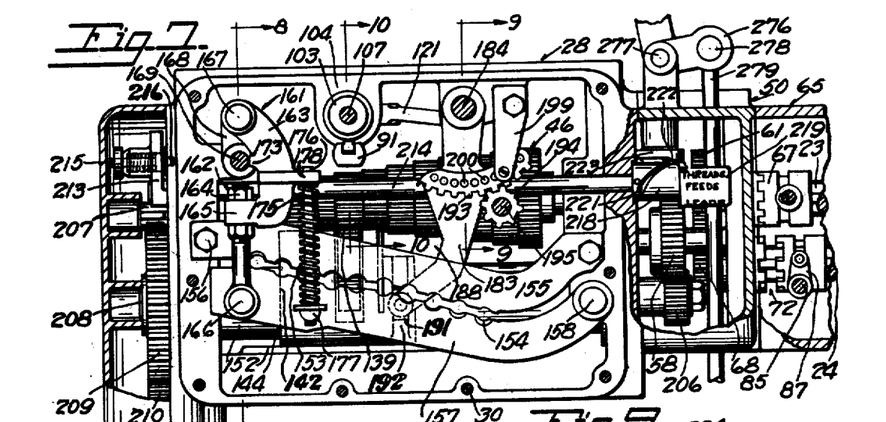
Fig. 7 is a longitudinal section of my improved device, taken in the plane of the line 7—7 of Fig. 2, and partly broken away.
Figures 8, 9, 10:
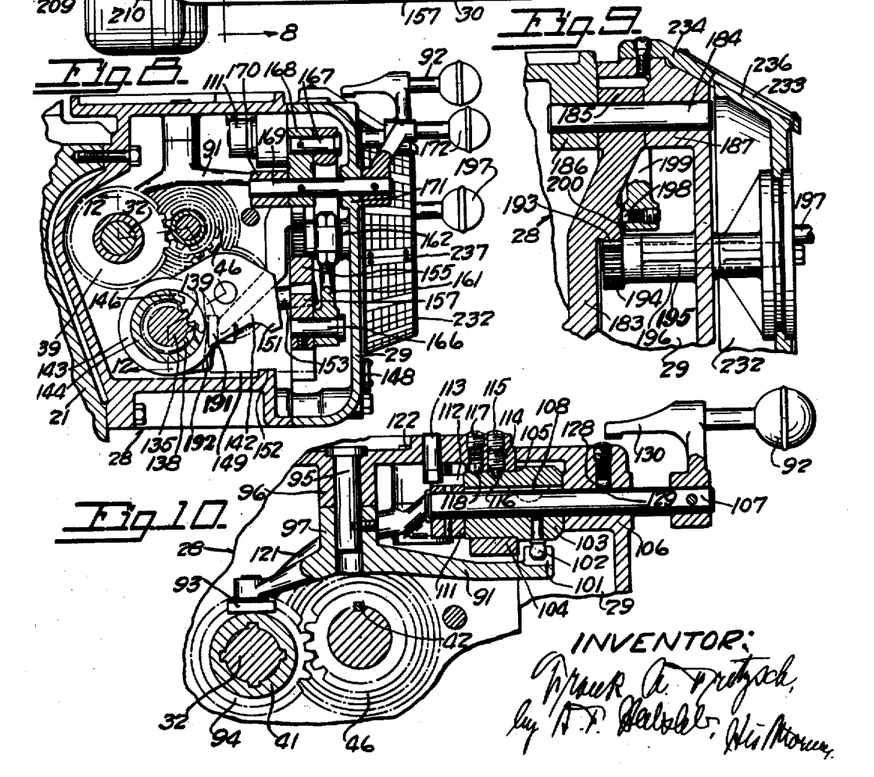
Fig. 8 is a cross-section of the same, taken in the plane of the line 8—8 of Fig. 7, and partly broken away.
Fig. 9 is a cross-section of the same, taken in the plane of the line 9—9 of Fig. 7, and partly broken away.
Fig. 10 is a cross-section of the same, taken in the plane of the line 10—10 of Fig. 7, and partly broken away.

In the present exemplification of my invention there is a casing 28, which may be termed a feed box, and may comprise a removable wall 29, secured to the body of the feed box by bolts 30. (Figs. 1, 2 and 7.) A shaft 32 is journaled in a bearing 33 in the end wall of the casing at one of its ends, (Fig. 12), the other end thereof having a cup 34 keyed thereto and journaled in a bearing 35 in the other end wall 36 of the casing. The shaft, the cup and the bearings are suitably held endwise in the casing.

Figure 11:
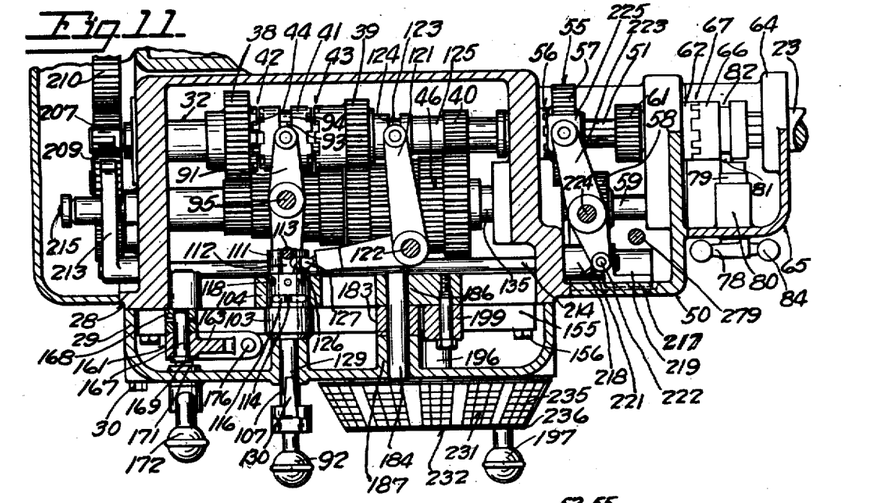
Fig. 11 is a horizontal section of the same, taken on the line 11—11 of Fig. 1, and partly broken away.
Figure 12:
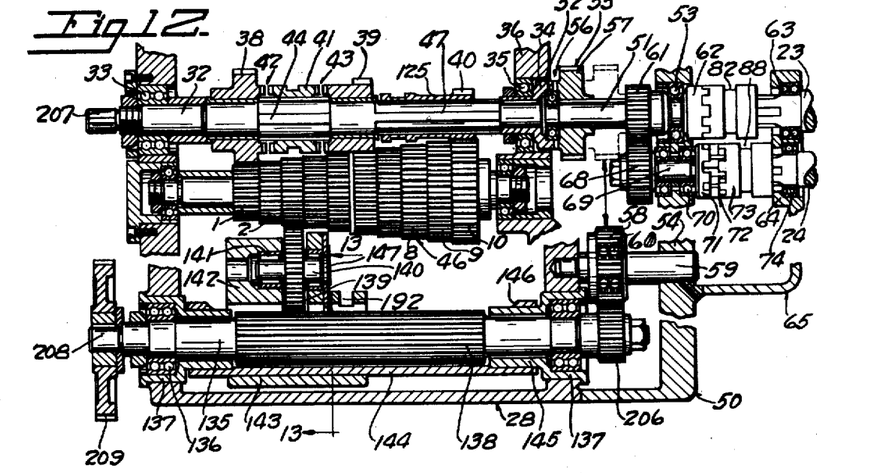
Fig. 12 is a plan view of a portion of the gearing of my improved device, laid out in plane, and taken in the plane of the irregular line 12—12 of Fig. 8, and partly broken away.

The shaft 32 has thereon gears 38, 39 and 40. (Figs. 11 and 12.) The gears 38 and 39 rotate loosely about the shaft and are held endwise with relation thereto, being spaced apart at fixed distance from each other. A clutch collar 41 is located between said gears, the clutch collar and the respective ends of the gears being provided with clutch teeth to form clutches 42, 43. This clutch collar rotates with the shaft and is slidable thereon by means of splines 44, to connect it with either of the gears 38, 39.

The gears 38 and 39 are in mesh with two of the gears of a group of diversely sized gears 46, also herein called a nest or cone of gears. The gear 40 rotates with the shaft 32, having spline connection 47 therewith, and is shiftable endwise so as to be placed in mesh with one of the gears of the nest of gears or out of mesh with this nest.

A short shaft 51, (Figs. 11 and 12) has one end thereof journaled in a bearing 52 in the cup 34 and the other end in a bearing 53 journaled in the end wall 54 of an extension 50 of the casing, the said shaft being held endwise in said bearings.

The cup 34 forms a clutch member fixed to said shaft. A combined clutch and gear element 55 has a clutch face thereon which coacts with a similar clutch face on the cup to form a clutch 56 and is provided with a gear 57. When this combined clutch and gear element is moved in one direction, the clutch is engaged, and when it is moved in the opposite direction the gear 57 is brought into meshing relation with a gear 58 on a short shaft 59 fixed in the end wall 54, the gear 58 rotating on a bearing 60 on said shaft.

The shaft 51 has a gear 61 fast thereon at one end of the bearing 53, and a clutch member 62 fast thereon at the other end of said bearing. (Figs. 7, 11 and 12.) The head end of the feed screw 23 is journaled in a bearing 63 in a wall 64 of a further extension 65 of the feed box, and extends into said clutch member. A clutch member 66 is splined to the feed screw and is engageable with and disengageable from the clutch member 62 to form a clutch 67 to connect and disconnect the feed screw with relation to the short shaft 51.

The gear 61 is in meshing relation with a gear 68 on a short shaft 69 journaled and held endwise in a bearing 70 in the end wall 54. The said gear 68 is fixed to said shaft at one end of said bearing. A clutch member 71 of a clutch 72, is fixed to said shaft at the other end of said bearing. This clutch also comprises a clutch member 73 splined to the feed rod 24. The clutch member 73 is slidable lengthwise on the feed rod to engage and disengage the clutch. The head end of the feed rod 24 is journaled in a bearing 74 in the wall 64 and extends into the clutch member 71.

Either or both of the clutches 67, 72 may be placed in clutching relation so as to place either the feed screw 23 or the feed rod 24, or both, in train with the cone of gears mechanism (Figs. 1, 7 and 11). A handle 78 is secured to a rockshaft 79, in a bearing 80, and has thereon an eccentric 81 located in an annular groove 82 in the clutch member 66 for moving the same axially for engagement or disengagement in the clutch 67. A handle 84 is fixed to a rock-shaft 85, journaled in a bearing 86, and has thereon an arm 87 provided with a suitable shoe in an annular groove 88 in the clutch element 73 for engaging or disengaging the feed rod 24 with the driving means.

The clutch collar 41 is operated by a lever 91 controlled by a handle 92. (Figs. 1, 7, 10, 11 and 14.) This lever has a shoe 93 pivoted thereon and located in an annular groove 94 in the clutch collar. A shoulder pivot pin 95 is journaled in a bearing 96, depending from the top of the casing, and is located in a bearing 97 in the lever, the lever being secured to said pin. The lever is provided with a slot 101 extending lengthwise thereof, with the walls of which a pin 102 coacts. The pin is on a rockable hub 103, rockable in a bearing 104 in the casing, and held endwise between a shoulder 105 on the hub which engages said bearing and by having the end of the hub engage a bearing 106 in the removable wall of the casing. A rock shaft 107 is slidable endwise and rockable in the bearing 106. This shaft has spline connection 108 with said hub. The handle 92 is fixed to said rock shaft.

Figure 14:
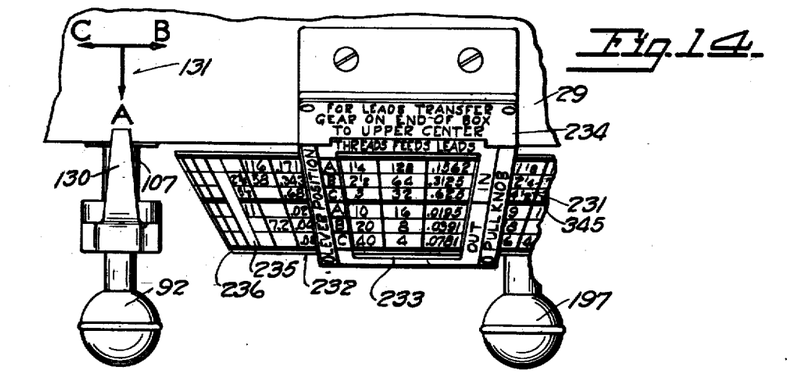
Fig. 14 is a plan view of operating means for speed changes in the feed box, partly broken away.

The inner end of the rock shaft is provided with a collar 111, which has a slot 112 therein lengthwise of the rock shaft, a pin 113 secured in the top of the casing being received in said slot, to prevent rocking movement of the shaft while the walls of the slot contact the pin.

When the handle 92 and the rock shaft are moved inwardly to full extent, the walls of the slot 112 leave the pin 113 free to permit rocking movement of the handle and the rock shaft. Thereupon rocking of the rock shaft operates the lever 91 and shifts the clutch collar 41 endwise in either direction for engagement with either gear 38 or 39, or for being placed in neutral position between the same.

A locating pin 114 threaded in the top of the casing and secured in operative position by a plug 115, has its end located in an angular slot 116 in the hub to limit rocking movements of the hub when the clutches 42, 43 are engaged. A spring-pressed ball 117 resiliently held in the casing is received in any one of three notches 118 in the hub to denote neutral position and end positions respectively of the clutch collar 41.

A bell crank lever 121, (Figs. 7, 10 and 11), is pivoted by a pivot pin 122 to the top of the casing by a pivotal connection similar to the pivotal connection 95. A shoe 123 is pivoted to this bell crank lever and is located in an annular slot 124 in the hub 125 of the gear 40 for shifting the gear 40 endwise into or out of mesh with the nest of gears. The collar 111 is provided with an arcuate slot 126 in which a pin 127 at the other end of the bell crank lever is located for shifting said ball crank lever by endwise movement of the collar 111 by means of the handle 92 for engaged relation or disengaged relation of the gear 40. When the handle and rock shaft are moved outwardly to full extent a spring-pressed ball 128 is received in a notch 129 in the rock shaft to aid in maintaining meshing relation of the gear 40.

The handle is provided with a finger 130 (Fig. 14) adapted to register with notations A, B and C on an index 131, to denote engaged relations respectively of the gear 40 and clutches 42, 43 respectively for clutched relations of the gears 38 and 39.

It is necessary to move the collar 111 endwise inwardly out of range of the pin 113, whereby the gear 40 is moved out of meshing relation with the nest of gears, before it is possible to move the clutch collar 41 out of neutral position, and the clutch collar 41 must be in neutral position before reentry of the pin 113 into the slot 112 can take place to permit endwise movement of the rock-shaft 107 to re-engage the gear 40 with the nest of gears. The structure stated forms an interlock between the clutch collar 41 and the gear 40 to prevent both of these having simultaneous drive connection with the nest of gears.

Figure 13:
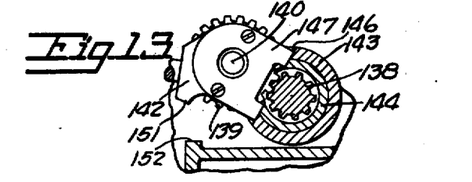
Fig. 13 is a detail view of the same, and taken in the plane of the line 13—13 of Fig. 12.

A tumbler shaft 135 is journaled and held endwise in bearings 136 in cups 137, fixed in the end walls of the casing. (Fig. 12.) This shaft has a long gear 138 fast thereon, with which an axially and angularly movable tumbler gear 139 meshes. The tumbler gear is mounted on a stud shaft 140, journaled in bearings 141 of a tumbler arm 142. The tumbler arm has a bearing 143 which is movable lengthwise on a sleeve 144, the ends of which are received bearingwise on the journal extensions 145 of the cups 137. The sleeve is provided with a slot 146 extending lengthwise thereof through which the tumbler gear 139 reaches into mesh with the long gear 138. The sleeve rocks with the tumbler arm, and the tumbler arm moves lengthwise on the sleeve. The tumbler arm has a plate 147 secured thereto, (Fig. 13), the edges of the inner end of the plate riding on the respective walls of the slot 146 for holding the sleeve rotatively to the tumbler arm. The tumbler arm is movable angularly so that its tumbler gear 139 may be brought into meshing relation with any of the gears of the nest of gears 46, opposite which or in registry with which it has been placed by axial movement of the tumbler arm.

The actuating means for moving the tumbler arm respectively axially and angularly are located inside the casing while the control or operating means therefor are located outside the casing, (Figs. 1 and 2), with mere bearings and journal connections in the casing for the latter, whereby a closed casing is employed devoid of the usual slots or openings accommodating an axially and angularly movable tumbler lever or other actuator for the tumbler arm, thereby protecting the inside of the casing and the mechanism therein from chips, dirt and other deleterious substances, and keeping the inside of the casing clean. The closed casing or feed box may thereby also be used as a lubricant reservoir to lubricate the operating means inside the casing and form a suitable sump for a lubricant pump, which forces the lubricant by means of suitable pipes and passages to the various operating parts at the head end of the lathe. A lubricant window 148 in the removable wall of the casing exposes the desired level 149 of lubricant in the casing.

The tumbler arm is movable angularly into operative position and into retracted position, in which latter position it is axially movable, (Figs. 7, 8, 9 and 11), the tumbler arm for convenience being provided with the riding shoe 151 which rides on a track 152 when in such retracted position. The tumbler arm is also provided with a lug 153, arranged to be located in any one of notches 154, corresponding in number to the number of gears in the nest or cone of gears, for positioning the tumbler arm lengthwise of the nest of gears and for moving the tumbler angularly into and out of meshing engagement with the selected gear of the nest.

The notches are preferably divided, a portion thereof being on a plate 155, the ends of which are fixed by bolts 156 to flanges extending inwardly from the end walls of the casing, and the other portion thereof being on a movable plate 157, pivoted at one of its ends by a pivot 158 to one of said flanges extending inwardly from one of said end walls at one end of the nest or cone of gears. The plates extend lengthwise of said nest or cone.

Movement of this movable plate is shown accomplished by means of an adjustable link 161, having an adjustment 162 therein for lengthening and shortening the same, one end of said link being in the form of a reclining U member 163, the said adjustment being at the lower end of said member, by means of locating nuts 164 threaded over the threaded end of the lower member of said link and positioning said upper member endwise by its bearing 165 between said nuts. The lower end of this link has articulation by means of a pin 166 and bearing thereabout for articulating said link with the movable plate 157.

The other end of said link is articulated by a pin 167 with an arm 168, fixed to a rock-shaft 169, journaled in a bearing 170 in the body of the casing, and a bearing 171 in its removable wall, and having an operating handle 172 fixed thereto, the said rock-shaft, arm and handle forming a bell crank lever. The axis of the articulation 167 is preferably moved into or beyond the plane in which the pivots of the articulations 166 and 169 are located, and which is parallel with the line of force acting to induce separation between the tumbler gear and the nest of gears, to move the link into locking position, and to hold the tumbler gear in meshing relation with the nest of gears. In such relation the rock-shaft 169 is located in the recess of the reclining U-shaped member 163, the latter having a knob 173 arranged to strike the rock-shaft when the link has been moved into connecting position.

The articulation 167 may also be urged into such locking relation and urgingly held therein by a spring 175 coiled about a rod 176 held by a pin 177 to the movable plate 157, and located between said pin and a lug 178 on said U-shaped member.

When it is desired to change the meshing relation of the tumbler gear, the handle 172 is moved downwardly, which causes the movable plate 157 to move away from the plate 155 and to locate the shoe 151 in riding position on the track 152, the movable plate descending sufficiently so that the walls of the notches 154 thereon are out of range with the lug 153 on the tumbler arm. The tumbler arm may then be moved axially to place its tumbler gear opposite the selected gear of the nest of gears, and to place the lug 153 thereon opposite a proper half notch on the plate 157 for transverse registry of the tumbler gear with the newly selected gear of the nest of gears. The handle 172 is thereupon moved in the opposite direction for moving the movable plate 157 on its pivot for engaged relation of the tumbler gear and the seating of the lug 153 in the proper coactive notch between the plates 155, 157 for proper axial and angular location of the tumbler arm. When the tumbler gear is in meshing relation, the parting line between the plates is inclined to conform to the inclination of the cone of gears, so that the tumbler gear may be similarly meshed with any gear of the cone of gears. The plates hold the lug jaw-like between them.

The means for moving the tumbler axially comprise an actuating arm 183, (Figs. 7, 8, 9 and 11), which is movable lengthwise of the nest of gears, and is pivoted on a pivot pin 184 extending crosswise of the nest of gears and having a bearing 185 of the actuating arm thereabout, the pivot pin being located in bearings 186, 187 respectively on the body and the removable wall of the casing. The actuating arm is shown as depending in the casing and has a recess 188 in which the tumbler mechanism is received when the tumbler arm is moved into registry with the gears at one end of the nest of gears. The swinging end of the actuating arm has a shoe 191 pivotally connected therewith, the shoe being slidable in a slot 192 of the bearing of the tumbler arm for converting the angular movement of the actuating arm into axial movement of the tumbler arm.

The actuating arm has a segment rack 193 fast thereon, with which a pinion 194 meshes. This pinion is fixed to an operating shaft 195, which is journaled in a bearing 196 on the removable wall of the casing and has an operating handle 197 connected therewith for rotating the same. (See also Figs. 1 and 2.) A spring-pressed ball 198 in an arm 199 fixed bracketwise to the casing is received in locating notches 200 in the segment rack to locate the tumbler gear opposite the respective gears of the nest of gears, there being one of these notches for each axial position of the tumbler arm.

Various of the operating devices of the feed box are mounted on the removable wall and are arranged to be conveniently assembled with the devices in the body of the casing when the removable wall is secured to the body.

The feeding values of the nest of gear and tumbler mechanism may be increased or modified by changing the direction of transmission therethrough, which is normally from the tumbler gear to the nest of gears. The normal transmission is employed for feeding the tool by means of the lead screw to produce a given travel of the tool, for instance, lengthwise of the work, measured in inch measurement per revolution of the work and resulting, for instance, in the cutting of threads at given numbers of threads per inch, when employing the English or U. S. system of measurement. The speed changing means for such cutting is set according to an index on which the numbers of threads per inch are arranged in increasing order.

The advance of the tool may also be obtained by means of the feed rod, the feed being customarily measured in fractions of an inch, for instance, in thousandths, per revolution of the work, the resultant feeds being noted on a corresponding index.

It is desired to also arrange the feeding mechanism so that the feed in inch measurement by the lead screw per revolution of the work is arranged on an index in decimal values, denoting leads. If the transmission through the nest of gears and tumbler mechanism for such latter character of feed continued to be in the same direction, the values thereof would be arranged in reverse order to that of the threads on the index. In order to permit the values for resultants for the leads to be placed in increasing order on the index, similarly to the threads, the direction of transmission through the nest of gears and tumbler is reversed, so that the nest of gears becomes the driver and the tumbler shaft 135 becomes the driven member of the train.

A transmitting gear 206 is fixed to the tumbler shaft and meshes with the gear 58. The clutch 56 is engaged when the transmission to the lead screw and the feed rod is in usual direction. When the transmission is in reverse direction to drive the lead screw and the feed rod from the tumbler shaft as the driven member, the combined clutch and gear element 56 is shifted endwise to release its clutch and to mesh its gear 57 with the gear 58.

In order to change the direction of transmission through the nest of gears and tumbler mechanism, the shafts 32 and 135 are in the present exemplification each extended to the outside of the feed box, (Figs. 2, 7, 11 and 12), and are respectively provided with gear receiving portions 207 and 208 for selectively receiving a transposable gear 209, which in either position receives its motion from a driving gear 210. The term transposable and terms of similar import as applied to the gear 209 includes the transposition of the same gear or a similar gear, or the substitution of a gear of different diameter in either of said positions.

By placing the transposable gear 209 on the shaft 135, feed values of the feed screw measured in threads per inch are obtained. Feeds by the feed rod are also complemental to such thread designations, so that desired advances of the tool by the screw or by the feed rod may be readily obtained by changes in the speed changing mechanism. If decimal values of tool advance by the lead screw are desired for leads, the transposable gear is changed to the shaft 32, whereby the direction of power is from the nest of gears to the tumbler mechanism, and the gears 206, 58 and 57 to the lead screw, the resultant leads being shown in additional columns on the index in the same order of progression as the threads. The feed rod may also be operatively connected with this train for feed resultants.

To prevent error in setting up the machine for either threads or leads, an interference part 213 is provided which is arranged to be placed in interfering relation with the placement of the transposable gear 209 on the shaft 135 or on the shaft 32, shifting means being provided for the interference part so that it must be in interfering relation with either position of the transposable gear. This interference part is shown as a plate fixed to a rock-shaft 214 journaled in the frame of the casing and provided with a spring-pressed pull pin 215 engaging suitable positioning holes 216 in the end wall of the casing.

In order that the operator may have before him a designation showing on which shaft the transposable gear is mounted, the front wall of the extension 50 of the feed box is provided with a window 217. (See also Figs. 1, 7 and 11.) The shaft 214 extends lengthwise of the feed box, and has a collar 218 fixed thereto, the collar having an apron 219 extending therefrom forming an indicator on which the designations of threads, feeds and leads are shown.

In the present exemplification of the mechanism when arranged for cutting according to the U. S. or English system of measurement, threads and feeds are obtained respectively by the lead screw and the feed rod, when employing the tumbler shaft as the driver, and leads are obtained by the lead screw when employing the cone of gears as the driver. The designations threads, feeds and leads are therefore so positioned and so spaced on the apron and the window is so placed and of such height, that either the designations threads and feeds or the designation leads appear at the window to advise the operator of the internal set-up in the feed box and of the position of the interference part for location of the transposable gear on the shaft 135 for cutting threads or employment of the feed rod, or on the shaft 32 for cutting leads.

In order that transmission from the group of gears and tumbler mechanism to the lead screw and feed rod may be assured in accordance with the position of the transposable gear, the combined clutch and gear element 55 is instanced as operatively connected with one of the shiftable elements indicating or controlling the position of the transposable gear, (Figs. 6, 7 and 11), accomplished in the present instance by providing the collar 218 with a cam slot 221 in which a pin 222 is received, the pin being on a lever 223 pivoted on a pin 224 in the inside of the extension of the casing. The other end of this lever has a fork 225 pivoted thereto, the fork being received about the gear 57 for moving the combined clutch and gear element for either engaging the clutch 56 when the interference part is in interfering relation with the shaft 32, or the indication of threads appears at the window 217, or placing its gear in mesh with the gear 58 when the interference plate is in interfering relation with the shaft 135, or the indication of leads appears at the window 217. (See also Fig. 1.)

The means for shifting the shiftable element of the cone of gears and tumbler mechanism lengthwise are associated with indicating means to indicate the position of the shiftable member, instanced as the tumbler, and the feed values incident thereto. (Figs. 1, 2, 8, 9, 11, 14 and 15.) Thus there is an index 231, which in the present exemplification is on a wheel 232, from which the operating handle 197 extends. It comprises an indicator, shown as a window 233, in connection therewith, the window being on a bracket 234 secured to the removable wall of the casing, and having suitable instructions on the walls of the opening therein forming the window. The index is provided with suitable columns showing, respectively, threads, feeds and leads, arranged in groups to indicate, respectively, the threads, feeds and leads obtained by the speed changes in the gearing at each position of the tumbler.

Figure 15:
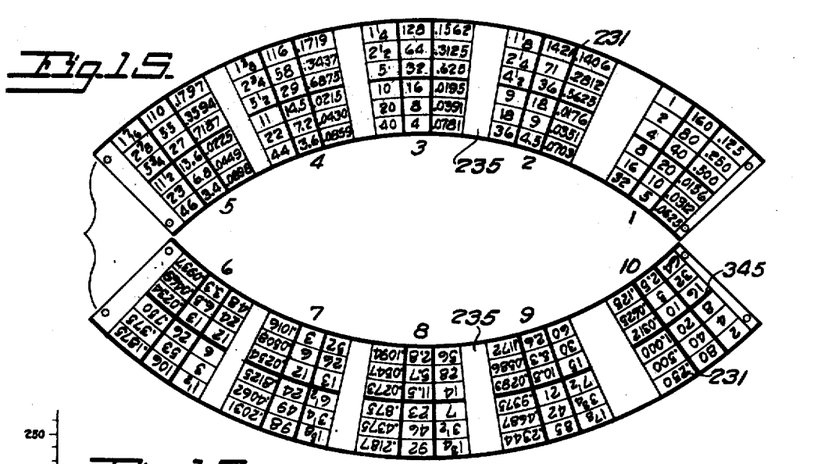
Fig. 15 is a plan view of an exemplifying index plate for speed change control of the cone of gears and tumbler mechanism.

These positions are respectively indicated by the up-position of the respective numerals 1 to 10 inclusive on the front face of the wheel 232, indicative of the respective gears of the cone of gears from smallest to largest. (Figs. 1 and 15.) Two superposed groups of feed values respectively for threads, feeds and leads, are shown in each of the columns forming the main group of numerals for the respective axial positions of the tumbler. The inner groups represent the finer feeding movements of the tool, and the outer groups represent the coarser feeding movements of the tool, obtained respectively by the selective feeding transmission hereinafter described.

The numerals of the index may be on a separate, preferably flexible, plate 235 attached to the frusto-conical peripheral face 236 of the operating wheel by means of screws 237. The index plate may be readily removable for the substitution of other plates having indicia or indexes of other values or other feed systems thereon.

The means for shifting the tumbler arm axially are operatively connected with the movable member of the index, so that movement of said movable member to obtain registry of the desired notation of speed resultant in the index also moves the shiftable member of the cone of gears and tumbler mechanism in coordinate relation for obtaining such speed resultant at the tool or other actuated part.

In the present exemplification ten diversely sized gears are shown as composing the cone of gears, by means of which ten different speeds are transmitted in one direction through the cone and tumbler mechanism, and these speeds are multiplied by two by changing the direction of transmission through the cone of gears mechanism.

These speeds are multiplied by three through the medium of the gears 38, 39, 40, selectively connected in transmitting relation with the cone of gears. These speeds may be further increased by the selective feed mechanism hereinafter described, and reversals of the feeding are obtained by the reversing gearing hereinafter described.

In the present exemplification, when transmitting power through the cone of gears and tumbler mechanism, using the tumbler shaft as the driver, the resultant speeds are arranged in decreasing ratio from the end of smallest diameter of the cone to the end of the largest diameter thereof, the tumbler gears being the same and the cone gears increasing in diameter, for example, from a one to one ratio decreasingly to a one to one-half ratio.

When employing the cone of gears as the driver, the resultant speeds are arranged in increasing ratio from the end of smallest diameter to the end of largest diameter of the cone, because the driving gears then increase in diameter, whereas the tumbler gears remain the same, the variations being from a one to one ratio increasingly to a two to one ratio.

Figure 16:
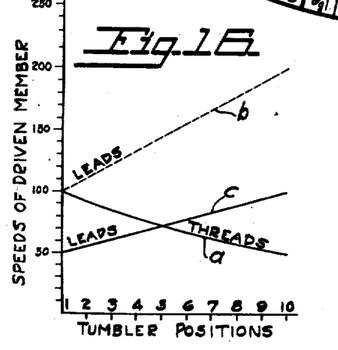
Fig. 16 is an exemplifying view of the transmission effects of the cone of gears and tumbler mechanism as modified by my improved device.

Assuming that the tumbler shaft when driving as when cutting threads, has a speed of 100 R. P. M., which speed is arbitrary and merely for illustration, the range of speed of the cone of gears shaft is 100 R. P. M. when the tumbler gear is in mesh with the smallest gear of the cone, to 50 R. P. M. when the tumbler gear is in mesh with the largest gear of the cone, as shown at $a$ in Fig. 16.

Assuming that the cone of gears shaft when driving as when cutting leads, has a speed of 100 R. P. M., the range of speed of the tumbler shaft is 100 R. P. M. when the tumbler gear is in mesh with the smallest gear of the cone to 200 R. P. M. when the tumbler gear is in mesh with the largest gear of the cone, as shown by the dotted line $b$ in Fig. 16.

The speed resultants, when using the cone of gears as a driver, are in a higher range, than are the speed resultants, when using the tumbler shaft as a driver. In carrying out my invention I equalize the register or ranges of the speeds obtained by the transmissions in opposite directions by qualifying, that is, increasing or decreasing the delivery effect of one of said registers or ranges upon the feeding devices. In the present exemplification I lower the register, or reduce the altitude of the range of speed resultants in the higher range so as to conform to the height of the range of speed resultants in the lower range, such speed resultants being instanced respectively as leads and as threads, so that their notations may be arranged within a narrower band and placed on an index, the movable member of which has operative connection with the tumbler, for moving the tumbler into relation with that gear of the cone of gears which is in consonance with the selected part of the index.

I therefore introduce the speed reducing train of gears 206, 58 and 57 between the tumbler shaft and the feed screw and feed rod, this train reducing the transmitting effect of the tumbler shaft one-half when the cone of gears is the driver, resulting in a range of transmitted speed for the tumbler shaft, in the example stated, of 50 R. P. M. to 100 R. P. M. of the tumbler shaft, as shown by the line c in Fig. 16, which is the same as the range of speed instanced when the tumbler shaft is the driver, but in inverse order, thereby bringing the range of leads and the range of threads, or other speed resultants, within the same band or range, for convenient arrangement on an index which also serves as a shifter for speed change.

This principle governs when the gear 39 is in transmitting relation with one of the gears of the cone, this transmission being at a one to one ratio. It also governs when either the gear 38, which is twice the size of the gear of the cone with which it meshes, or the gear 40, which is one-half the size of the gear of the cone with which it is arranged to mesh, are in transmitting relation with the cone.

I am thereby enabled to arrange the notations of threads and leads, or notations of other examples of speed resultants, side by side on the index of speed resultants, and to arrange these in groups about an operating wheel, or indicator therefor, which exposes the selected value of speed resultants and simultaneously places the tumbler in position for proper meshing relation to obtain the selected value.

An exemplifying index is shown in Fig. 15 laid out in plane, and is shown on bands or strips which may be annularly arranged about the frusto-conical periphery of an index wheel. Other notations may be substituted for the notations exemplified depending on the selected speeds and the selected examples or system of feeding, or other bands having such other notations thereon may be affixed to the index wheel.

I prefer to drive the speed changing mechanism for the various characters of feeds from the spindle 27, and to provide reversing means shown generally at 238, and a selective feeding transmission, shown generally at 239, in novel arrangement between the spindle and said speed changing mechanism. I do not herein claim the structure of said reversing means nor of said selective feeding transmission, having shown, described and claimed the same in my aforesaid copending application, but do herein claim their association with the feeding means.

Figures 3, 4, 5, 6:
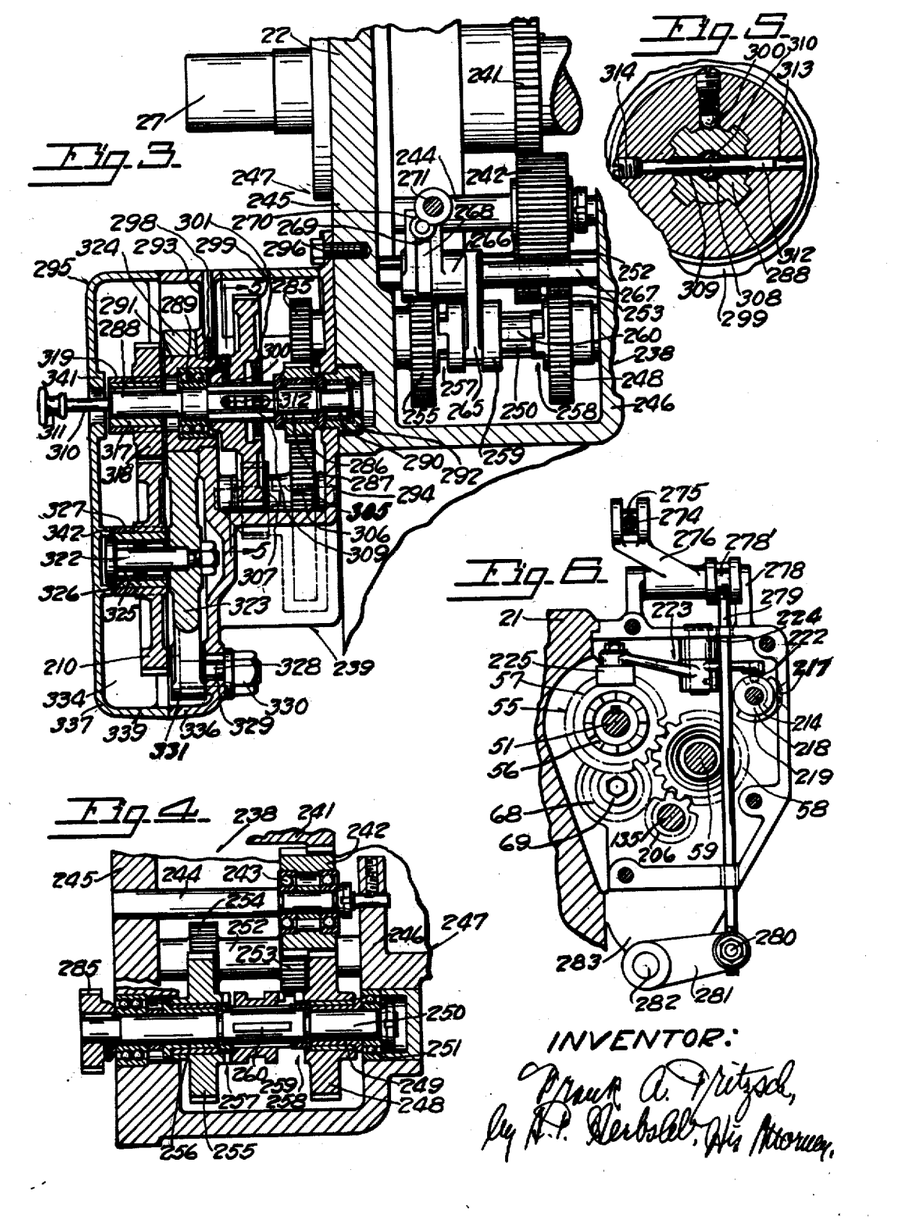
Fig. 3 is a longitudinal section, showing a portion of the gearing, taken on the irregular line 3—3 of Fig. 2, and partly broken away.
Fig. 4 is a detail view of the same, taken in longitudinal section on the irregular line 4—4 of Fig. 2.
Fig. 5 is a cross-sectional view of a detail of this gearing, taken on the line 5—5 of Fig. 3.
Fig. 6 is a cross-section of a portion of the gearing of my improved device and control means for the same, taken on the line 6—6 of Fig. 1, and partly broken away.

The spindle 27 has a transmitting pinion 241 keyed thereto so as to rotate therewith. (Figs. 2, 3 and 4.) This pinion meshes with a pinion 242 journaled by friction reducing bearings 243 on a stationary shaft 244, the ends of which are located in the head end wall 245 and the inner wall 246 of a lower extension 247 of the headstock. The pinion 242 meshes with a gear 248 journaled by a journal bushing 249 about a transmitting shaft 250 journaled by friction reducing bearings 251 in the walls of the lower extension 247. A reversing shaft 252 is journaled by suitable friction reducing bearings in the respective walls of said lower extension and has reversing pinions 253, 254 fixed thereon. The pinion 253 meshes with the pinion 242 and the pinion 254 meshes with a gear 255 journaled by a journal bushing 256 about the shaft 250. This rotates the gears 248, 255 in opposite directions from the spindle.

Transmission between said gears and the shaft 250 is obtained by means of clutches 257, 258 between said respective gears and a clutch collar 259, splined by splines 260 to said shaft and rotating with said shaft and movable endwise thereon. The clutch collar may be placed in intermediate or neutral position so that said gears will rotate loose about said shaft in opposite directions to interrupt the power feed of the carriage of the lathe, and the clutch collar may be shifted endwise on said shaft so as to connect with either of said gears to rotate said shaft respectively in opposite directions.

The clutch collar may be shifted by suitable means either manually, as shown and described in my aforesaid pending application, or automatically by the carriage in usual manner.

The means for shifting the clutch collar 259 and thereby controlling the direction of rotation of the shaft 250 comprise a clutch shifting fork 265 on a bearing member 266 slidable on a rod 267 fixed at its ends in the headstock. (See also Figs. 1 and 6.) The bearing member 266 is provided with a slot 268 in which a shoe 269 carried by an arm 270 rides. The arm is secured to a rock shaft 271 journaled in the front wall of the headstock and provided with an operating arm 272 secured at one of its ends to said rock shaft at the outside of the headstock. The operating arm at its other end has adjustable articulation 273 with one end of a rod 274, the other end of which is suitably secured in a stud 275 rotatably journaled in one end of a bell-crank lever 276 pivoted on a pin 277 held in bearing lugs 278 on the extension of the feed box. The other end of the bell crank lever has articulation 278' with one end of a rod 279, the rod passing through openings in the top and bottom walls of the extension of the feed box, and at its lower end having adjustable articulation 280 with an arm 281 fixed to an operating shaft 282. The operating shaft extends lengthwise of the bed and is journaled in a bearing 283 in said extension and in other suitable bearings (not shown) in the carriage and bed. A suitable hand lever (not shown) may be slidably splined to the operating shaft adjacent the carriage and adapted to move with said carriage, for manually shifting the clutch collar 259 from the carriage position.

Suitable means (not shown) may be provided for automatically operating the shaft 282 when the carriage reaches either limit of its feeding movement lengthwise of the bed, or when the carriage reaches either extreme limit of its movements for preventing injury to or breakage of the parts or work.

For operating the selective feeding transmission 239 from the reversing means 238, the shaft 250 has a pinion 285 fast thereon at its outer end at the outside of the headstock. (Figs. 2, 3 and 4.) The pinion 285 meshes with a pinion 286 having a friction reducing bearing 287 about a shaft 288. This shaft has friction reducing bearings 289, 290, in sleeves 291, 292 fixed in the respective walls 293, 294 of a gear box 295 fixed as by bolts 296 to the headstock and by bolts 297 to the feed box. The sleeve 291 is shown fixed to the gear box by a set screw 298. The shaft 288 also has a gear 299 thereabout having spline connection therewith. This gear rotates with the shaft and is movable endwise thereon, being positioned in its end positions by a spring-pressed ball 300, engaging notches in said shaft. The gear 299 is provided with internal teeth 301, forming a combined clutch and gear member, these teeth being arranged to engage the teeth of the pinion 286 to form a clutch between said pinion and said member.

An intermediate shaft 305 is journaled in said walls of the gear box, and has a gear 306 and a pinion 307 fast thereon, the gear being meshed by the pinion 286, and the pinion 307 being meshed by the gear 299. When these gears and pinions are in meshing relation as shown in Fig. 3, transmission is from the pinion 286 to the gear 306, simultaneously rotating the pinion 301, which meshes with the gear 299, having spline connection with the shaft 288 for rotating said shaft at a lower speed, representing the finer threads and leads, and feeds, for the usual lead screw and usual feed rod. When the combined clutch and gear element 299, 301 is moved to the right so as to engage its clutch teeth with the teeth of the pinion 286, the transmission is direct from said pinion to said shaft at a higher speed, representing the coarser threads and leads, and feeds, for the lead screw and feed rod, for example, respectively eight times the finer threads, leads and feeds. When said clutch is in engagement, the gear 299 is out of mesh with the pinion 301, being located in the space between the pinion 301 and the gear 306, the gear 306 and the pinion 301 then rotating idly.

In order to move the combined clutch and gear element 299, 301 endwise, the shaft 288 is provided with a bore 308, with which slots 309 in the wall of said bore adjacent to said combined clutch and gear element communicate. A push and pull rod 310 is operable in said bore and is provided with an operating knob 311, also designated a pull knob on the indicator in Fig. 14. This rod is provided with a pin 312, which is fast in the rod, and whose respective ends project radially in opposite directions through said slots and are located in holes 313 in the hub of the combined clutch and gear element 299, 301. The pin has a threaded head 314 threaded in a threaded outer end of one of the holes 313. (Fig. 5.)

A hub 317 of a compound change gear 318 is keyed to the shaft 288 so as to rotate therewith. The change gear has spline connection with the hub and is arranged to be slipped endwise off of the same for reception of a change gear of different pitch diameter. A collar 319 is releasable on the hub so as to hold the change gear to its hub.

The change gear 318 meshes with a change gear 210 on a stub shaft 322 fixed to a quadrant 323 having a bearing 324 about the journal sleeve 291. The change gear 210 has spline connection with its hub 325 which has a friction reducing bearing 326 about the stub shaft 322. A collar 327 is suitably releasably located on the hub to hold the change gear 210 to its hub. The quadrant 323 is arranged to be clamped in different radial positions by means of a bolt 328 in said quadrant passing through an arcuate slot 329 in the wall 293 of the gear box, and clamped in adjusted positions by means of a nut 330 threaded over said bolt. The head of the bolt is shown flat sided and located in a slot 331 of the quadrant to prevent turning of the bolt. The change gear 210 is arranged to be placed in proper meshing relation with the transposable gear 208 in either of its positions.

The outer end of the gear box 295 and the outer end of the feed box 28 are provided with a cavity 334 which extends across the joint 335 between said gear box and said feed box, and has therein the quadrant and the gears thereon and the gears with which said latter gears mesh, the cavity being provided with a marginal flange 336. A cover 337 covers said cavity, and is provided with an oppositely inwardly extending flange 339, which forms a joint with said first-named outwardly extending flange. The cover is readily removable and replaceable for convenience in changing the change gears thereunder. Bolts 340 pass through holes in said cover and are threaded into lugs extending inwardly from the flange 336 to hold the cover in place. The cover is provided with inwardly extending flanges 341, 342 to hold the change gears 318, 210 and their hubs in place.

The screw 23 is usually, in United States machine shop practice, provided with a thread cut according to the U. S. or English system of measurement in inches. It may, however, be desirable to employ the metric system or other module system of measurement in measuring tool movements while employing the same screw. If this be desired by means of my improved device, an increment, constant or factor is introduced into the gearing to adapt it for such selected other system, accomplished in the present exemplification by substituting other pick-off change gears, either single or multiple endwise, of different diameters, for the gears 318, 210 and 209, to produce the system desired. When changing from the English system of measurement to the metric system, such increment, constant or factor may in my improved device, be a change in tooth ratio as minute as that represented by the constant 80 over 127, thus:

$$\frac{80}{127}$$

being the most minute ratio in translating from inches to millimeters. A suitable corresponding index may also be substituted on the wheel 232, as by providing plates similar to the plates 235 but having the desired corresponding index thereon, releasably secured to the index wheel, the substituted plates being releasably held to the index wheel by the screws 237.

If a screw 23, provided with a metric thread, were in the machine, a change in feeding from the metric system to the English system of measurement would be obtainable by inverting the increment, constant or factor from 80 over 127 to 127 over 80, thus:

$$\frac{127}{80}$$

in selecting the proper change gears on the centers 311, 322 and 207 or 208, whereby very minute changes in gear ratios may be obtained.

The hubs of the pick-off change gears and their shafts at the quadrant 323 are of sufficient length so that multiple pick-off change gears may be mounted thereon to increase the range of speed changes permitted thereby. Since the quadrant 323 has pivotal bearing on the bearing sleeve 291 it may be swung in an arc whose center coincides with the axis of the shaft 288 for properly positioning the pick-off gear 210 or the gear substituted therefor. The quadrant may be clamped in adjusted positions. Changing and substitution of other gears, single or compound, for the change gears 318, 210 and 209 are readily and conveniently accomplished. Odd threads, feeds and leads may also be thus obtained.

Referring to Fig. 14, in the present exemplification, the positions A, B and C, in association with the designation "Lever position" on the indicator 233, denote the operative positions of the finger 130, when the gears 40, 39 and 38 are respectively in transmitting connection with the shaft 32 and the cone of gears, these transmitting connections being denoted as A, B and C in association with the index in Fig. 14 for the respective superposed groups of feed resultants, namely, threads and leads obtained by the lead screw, and feeds obtained by the feed rod. The outer groups of threads and leads, represented in the outer three cross columns of numerals on the index, (Figs. 14 and 15), are obtainable when the pull knob 311 is in "in" position, as shown by the notation on the indicator, resulting in coarser threads and leads by means of the selective feeding transmission 239, (Fig. 3), and the inner groups of threads and leads, represented by the inner three cross columns of numerals on the index, are obtainable when said pull knob is in "out" position, resulting in finer threads and leads by means of said selective feeding transmission 239. The two superposed groups are separated by the dividing line 345 on the index.

The groups of smaller numerical values of the threads and the groups of larger numerical values of the leads are obtained when the pull knob is in "in" position, whereby the coarser feeding of the selective feeding mechanism 239 is obtained, and these values are therefore grouped together cross columnwise, as shown by the outer group of three cross columns A, B and C on the index. (Figs. 14 and 15.) The groups of greater numerical values of threads and the groups of smaller numerical values of leads are obtained when the pull knob is in "out" position, whereby the finer feeding of the selective feeding transmission 239 is obtained, and these values are therefore grouped together cross-columnwise, as shown in the inner group of three cross columns A, B and C on the index. (Figs. 14 and 15.) The numerical values in the respective groups increase from their outer cross columns to their inner cross columns.

The number of threads per inch are read counterclockwise in the cross columns progressively and increasingly from the groups 1 to 10, and from the outer cross-column to the inner cross-column, of each group, as shown in Fig. 15, there being duplications between the groups 10 and 1. During the set-up for threads the tumbler shaft 135 is the driver, and the transition from the outer group of three cross-columns to the inner group of three cross-columns is uninterrupted in order. The reading of threads in groups 1 to 10 respectively represent the transmission effects of the smallest to the largest gear of the cone of gears, the speeds decreasing for obtaining increase in the reading of numbers of threads per inch.

The leads in decimals of an inch are also read in increasing numeral values counterclockwise in the respective superposed groups from 1 to 10 inclusive, the groups however being transposed, the shaft 32 being then the driver and the transmitted speeds by the cone of gears and tumbler mechanism increasing in inverse order to their order when the tumbler shaft 135 is the driver.

The numerical value of leads begin with the outer cross-column of the inner group at the position or group 1, progress counter-clockwise annularly through said cross column, the middle cross column and the inner cross column of the inner group, and then continue annularly through the outer cross column, the middle cross column and the inner cross column of the outer group of lead values. The lead numerals progress in value throughout the respective groups.

The setting of any composite group having any desired thread or lead value obtained by the lead screw, or feed value obtained by the feed rod, therein, so as to register with the window of the indicator, shifts the shiftable member of the cone of gears and tumbler into axial position to transmit the speed values of said composite group.

If a thread or feed is selected, the tumbler shaft 135 is the driver, and the interference plate 213 is shifted into interfering relation with the extension 207 of the shaft 32 and out of interfering relation with its extension 208 of the shaft 135, the operator noting that the designations, threads and feeds appear at the window 217 (Fig. 1). The transposable gear 209 is placed on the extension 208 of the shaft 135 thus exposed. This shifting of the interference plate exposes the designations "Threads" and "Feeds" at the window 217 and shifts the combined clutch and gear element 55 to engage the clutch 56 for transmission from the shaft 32 as a driven shaft to either the lead screw 23 for cutting threads, by operation of the handle 78 to close the clutch 67, or to the feed rod 24 for cutting feeds, by operation of the handle 84 to close the clutch 72. Transmission to both the lead screw and the feed rod may be obtained by operation of both said handles.

If a lead is selected, the shaft 32 is the driver, the interference plate 213 being shifted out of interfering relation with its extension 207, and the transposable gear being placed on said extension. This shifting of the interference plate exposes the designation "Leads" at the window 217, and shifts the combined clutch and gear element 55 to mesh its gear 57 with the gear 58, (Fig. 12), for transmission from the tumbler shaft 135 as a driven shaft to the lead screw for cutting leads.

The appearance of the designations "Threads" and "Feeds" or the designation "Leads" at the window 217 informs the operator of the position of the interference plate 213 and compels the proper placement of the transposable gear on the respective shafts 32, 135, and informs the operator at any time of the set-up in the feeding mechanism.

I have herein shown and described an exemplification of my invention. It is obvious that changes in structure and arrangement of the parts and mechanisms shown and described may be made without departing from my invention set forth in the following claims.

I claim:

1. In speed changing mechanism, the combination of a plurality of shafts having speed changing means therebetween, a driving gear to be selectively transmittingly connected with said respective shafts for transmission in opposite directions through said speed changing means, an indicator to denote the position for said gear, and an interference part for interference with said gear controlling the position of said gear and having operative connection with said indicator.

2. In speed changing mechanism, the combination of a plurality of transmission elements having speed changing means therebetween, a transposable driving part to be selectively transmittingly connected with said respective elements for transmission in opposite directions through said speed changing means, direction varying means complemental to said speed changing means, an indicator to indicate the position for said transposable driving part, and control means to control said transmitting connection having operative connection with said indicator.

3. Speed changing mechanism employing a group of diversely sized gears and tumbler gear and a pair of shafts selectively operative as driving shafts to oppositely transmit power through said group of gears and tumbler gear, a transposable gear, means to selectively operatively connect said transposable gear with said respective shafts, and an interference part to selectively obstruct operative connection of said transposable gear with said respective shafts.

4. In speed changing mechanism, the combination of a group of diversely sized gears and tumbler gear and a pair of shafts selectively operative as driving shafts to oppositely transmit power through said group of gears and tumbler gear, a transposible gear, means to selectively operatively connect said transposable gear with said respective shafts, an indicator to indicate the selected operative connection of said transposable gear, and an interference part to selectively obstruct operative connection of said transposable gear with said respective shafts, said interference part having operative connection with said indicator.

5. In speed changing mechanism, the combination of a group of diversely sized gears and tumbler gear, and a pair of transmitting elements selectively operative as driving elements to oppositely transmit power through said group of gears and tumbler gear, a transposable driving member, means to selectively operatively connect said transposable driving member with said respective transmitting elements, an indicator to indicate the selected operative connection of said transposable driving member, speed varying means complemental to said group of gears and tumbler gear, a releasable driving connection between the same, and an interference part to selectively obstruct operative connection of said transposable driving member with said respective transmitting elements, said interference part having operative connection with said indicator and with said releasable driving connection to synchronize movements of said interference part, said indicator and said releasable driving connection.

6. In feeding mechanism for a lathe adapted for feeding movements in accordance with a plurality of feeding systems, the combination of a group of diversely sized gears and tumbler gear and a pair of transmitting elements selectively operative as driving elements to oppositely transmit power through said groups of gears and tumbler gear, feeding means operated thereby, speed change gearing in advance of said transmitting elements, a transposable driving member, means to selectively transmittingly connect said transposable driving member with said speed change gearing and said respective transmitting elements, means to transmittingly connect said respective transmitting elements to said feeding means in alternation with the connection of said transposable driving member with said respective transmitting elements, means to obtain speed change in said speed change gearing for driving said transmitting elements at selective speeds for said respective systems, and interfering means directing selection of connection of said transposable driving member.

7. In feeding mechanism for a lathe adapted for feeding movements in accordance with a plurality of feeding systems, the combination of a group of diversely sized gears and tumbler gear and a pair of transmitting elements selectively operative as driving elements to oppositely transmit power through said group of gears and tumbler gear, feeding means operated thereby, supplemental gearing including a shiftable element between one of said transmitting elements and said feeding means introducing a complemental feed variation, speed change gearing in advance of said transmitting elements, a transposable transmitting member, means to selectively transmittingly connect said transposable transmitting member with said speed change gearing and said respective transmitting elements, means to transmittingly connect said group and tumbler gear respectively to said feeding means in alternation with the connection of said transposable transmitting member with said respective transmitting elements, means to obtain speed change in said speed change gearing for said respective feeding systems, and interfering means for said transposable transmitting member having operative connection with said shiftable element directing selection of connection of said transposable transmitting member and consonant shifting of said shiftable element.

8. In combination, a group of diversely sized gears and tumbler gear, means including a pair of elements selective as driving members for opposite power transmission through said group of gears and tumbler gear for different transmission effects, supplemental gearing including a movable member to selectively transmittably connect with said group of gears and tumbler gear for power transmission in either direction therethrough, an indicator indicating the respective transmission effects, a transposable driving element for connection with said respective driving members, and an interference member movable to interfere with operative connection of said transposable driving element with said respective driving members, said interference member, said movable member and said indicator operatively connected for combined movements.

9. In combination, a group of diversely sized gears and tumbler gear, means including a pair of elements selective as driving members for opposite power transmission through said group of gears and tumbler gear for different transmission effects, an indicator indicating the respective transmission effects, a transposable transmission member for connection with said respective driving members and an interference member movable to interfere with operative connection of said transposable transmission member with said respective driving members, said interference member having operative connection with said indicator to indicate the permissible connection of said interference member.

10. In lathe feeding means, the combination of a group of diversely sized gears and tumbler gear selectively driven to oppositely transmit power therethrough, supplemental speed changing means including a releasable connection with said tumbler gear, a feed screw having selective operative connection with said group and said supplemental speed changing means respectively for thread cutting and for lead cutting, a selective feeding means having materially different speed transmissions and having selective drive connection with said group and said tumbler gear respectively, an index including an indicator part on which the resultant threads and leads are angularly arranged in a plurality of groups of feed resultants, and an indicator part therefor, one of said indicator parts being rotatable and having operative connection for speed change between said group and said tumbler gear.

11. In speed changing mechanism, the combination of a movable speed change member movable into a plurality of positions for different speed changes, an index wheel having operative connection with said movable speed change member to move the same for such speed changes, said index wheel having a frusto-conical outer peripheral face on which a plurality of series of columns of related speed resultants are provided, and an indicator to denote a given one of said series with which selective ones of said series are arranged to register by rotation of said index wheel to so move said speed change member.

12. In speed changing mechanism, the combination of a movable speed change member movable into a plurality of positions for different speed changes, an index wheel having operative connection with said movable speed change member for such speed changes, said index wheel having thereon a series of grouped related speed values denoting threads and leads arranged about the axis of rotation of said index wheel, and an indicator with which the respective groups of said related speed values are arranged to register by movement of said speed change member into corresponding positions of speed value upon rotation of said index wheel.

13. In speed changing mechanism, the combination of a pair of speed change members comprising a group of diversely sized gears and a tumbler gear therefor, means for axial shifting between said members for selective positioning between said tumbler gear and the gears of said group for selective speed changes, said last-named means comprising an actuated element, an index wheel having rotative connection with said actuated element to effect such axial shifting and having thereon a series of speed values corresponding with the speed values of the positional relations between said tumbler gear and said gears of said group, and an indicator for said index wheel to indicate selective ones of said speed values thereon corresponding with the respective positional relations between said tumbler gear and said gears of said group.

14. In speed changing mechanism, the combination of an actuated member for controlling speed change, an index wheel having operative connection with said actuated member and provided with an outer peripheral substantially frusto-conical index face having shown thereon a series of speed values corresponding with the speed values resulting from the positions of said actuated member, and a stationary window through which to view said selective speed values on said substantially frusto-conical index face.

15. In speed changing mechanism for feeding means to feed an operated part for selective threads, feeds and leads and comprising an operated member, an index wheel having operative connection with said operated member and having on its periphery a series of groups of notations of threads, feeds and leads produced by manipulation of said operated member in said speed changing mechanism, the positions of said operated member and the angular positions of said groups corresponding with each other by said operative connection, and an indicator with which said respective groups of notations register upon corresponding shifted relation of said operated member.

16. In speed changing mechanism, the combination of a group of diversely sized gears and a tumbler gear arranged for coaction with the respective gears of said group and including an actuated member for effecting speed changes therein, supplemental speed changing means to increase said last-named speed changes, and an index wheel having operative connection with said actuated member and provided with a series of angularly arranged notations of speed resultants obtained by actuation of said actuated member and arranged in groups of notations of speed resultants obtained by manipulation in said supplemental speed changing means.

17. In speed changing mechanism, the combination of a group of diversely sized gears and a tumbler gear arranged for coaction with the respective gears of said group and including an actuated member for effecting speed changes therein, supplemental speed changing means to increase said last-named speed changes, an index wheel having operative connection with said actuated member, said index wheel provided with angularly arranged group of notations of speed resultants respectively obtained through actuation of said actuated member increased by manipulation in said supplemental speed changing means, and an indicator with which said angularly arranged groups are arranged to respectively register upon rotation of said index wheel to actuate said actuated member.

18. In speed changing mechanism, the combination of a pair of power transmitting members comprising respectively a group of diversely sized gears and a tumbler gear arranged for coaction with the respective gears of said group of gears and including an actuated member effecting speed changes therein, means whereby either of said transmitting members is constituted the driving member of said pair to transmit different characters of speed values through the other member of said pair as a driven member, and an index wheel having operative connection with said actuated member and provided with angularly arranged groups of said different characters of speed values angularly positioned in relation to the actuated positions of said actuated member to produce said respective speed values.

19. In speed changing mechanism, the combination of a group of diversely sized gears, a tumbler device including a tumbler gear arranged to mesh with the respective gears of said group, means for shifting said tumbler device lengthwise of said group independent of said last-named means and a bar to place said tumbler gear in the plane of any selected gear of said group, provided with locating parts coacting with said tumbler device, said locating parts arranged stepwise in coordination with the stepwise arrangement of said diversely sized gears when said bar is in position for meshing of said tumbler gear, and means to move said bar toward said group whereby to move said locating parts collectively to shift said tumbler gear into meshing relation with said selected gear.

20. In speed changing mechanism, the combination of a group of diversely sized gears, a tumbler device including a tumbler gear arranged to mesh with the respective gears of said group, means for shifting said tumbler device lengthwise of said group to locate said tumbler gear in the plane of any selected gear of said group, and a movable bar provided with locating parts arranged stepwise coordinately with the stepwise arrangement of the diversely sized gears of said group when said bar is in position for meshing of said tumbler gear and coacting respectively with said tumbler device in its various shifted positions for moving said tumbler device to mesh said tumbler gear with the selected gear of said group.

21. In speed changing mechanism, the combination of a cone of gears, an axially and angularly movable tumbler arm, a tumbler gear thereon movable opposite any selected gear of said cone by axial movement of said tumbler arm, a bar pivoted adjacent to one end of said cone, said bar and said tumbler arm provided with coacting locating parts to locate said tumbler gear in the respective planes of said selected gears, and moving means for pivotally moving said bar to angularly move said tumbler arm for meshing relations of said tumbler gear with the respective gears of said cone.

22. In speed changing mechanism, the combination of a cone of gears, an axially and angularly movable tumbler arm and tumbler gear thereon meshable with the respective gears of said cone, a bar pivoted adjacent to one end of said cone, a companion bar therefor, said tumbler arm having a locating part, said bar provided with coactive locating parts for the latter to selectively position said tumbler gear opposite selected ones of said gears of said cone, and means for pivotally moving said pivoted bar to locate said first-named locating part between said coactive locating parts.

23. In speed changing mechanism, the combination of a cone of gears, an axially and angularly movable tumbler arm and tumbler gear thereon meshable with the respective gears of said cone, a bar pivoted adjacent to one end of said cone, a companion bar therefor, said tumbler arm having a locating part, said bars provided with coactive locating parts for the latter to selectively position said tumbler gear opposite selected ones of said gears of said cone, means for pivotally moving said pivoted bar to locate said first-named locating part between said coactive locating parts, and a track for said tumbler arm along which to axially move said tumbler arm.

24. In speed changing mechanism, the combination of a cone of gears, an axially and angularly movable tumbler arm and tumbler gear thereon meshable with the respective gears of said cone, an operating bar to angularly move said tumbler arm, and a toggle link to operate said bar and movable into locking relation upon meshing position of said tumbler gear.

25. In speed changing mechanism, the combination of a cone of gears, an axially and angularly movable tumbler arm and tumbler gear thereon meshable with the respective gears of said cone, an operating bar to angularly move said tumbler arm, a toggle link to operate said bar and movable into locking relation upon meshing position of said tumbler gear, and a spring acting on said toggle link to normally urge the same into such locking relation.

26. In speed changing mechanism, the combination of a cone of gears, an axially movable coacting tumbler gear therefor, an arm movable lengthwise of said cone on a pivot extending crosswise of said cone and having operative connection with said tumbler gear to axially move the same opposite any selected gear of said cone, and an index comprising a movable index part having operative connection with said arm to pivotally move said arm and thereby so axially move said tumbler gear lengthwise of said cone for measured distances corresponding with the indicating values of said movable index part.

27. In speed changing mechanism, the combination of a cone of gears, an axially movable coacting tumbler gear therefor, an arm movable lengthwise of said cone on a pivot extending crosswise of said cone, said arm having operative connection with said tumbler gear to axially move the same, said arm provided with a rack extending lengthwise of said cone, and an index comprising a movable index part having gear connection with said rack to pivotally move said arm and thereby axially move said tumbler gear lengthwise of said cone for measured distances corresponding with the indicating values of said movable index part.

28. In speed changing mechanism, the combination of a cone of gears, a tumbler arm and a tumbler gear thereon movable axially for placement opposite any selected gear of said cone, a pivoted arm movable lengthwise of said cone on a pivot extending crosswise of said cone and having operative connection with said tumbler arm for such placements, a track extending lengthwise of said cone on which said tumbler arm is movable axially when in retracted position, means to move said tumbler arm angularly different distances in different axial positions of the same for meshing relation of said tumbler gear with the respective gears of said cone, an operating handle, and means operated thereby having operative connection with said tumbler arm to move said tumbler arm such different distances by movements of said operating handle one operating distance.

29. In speed changing mechanism, the combination of a cone of gears, a tumbler arm and a tumbler gear thereon movable axially opposite any selected gear of said cone and retractable different angular distances from meshing relation of said tumbler gear with the respective gears of said cone, and an operating handle and means operated thereby having operative connections with said tumbler arm arranged stepwise lengthwise of the cone in coordination with the stepwise arrangement of the gears of said cone when in actuated position for tumbler gear engagement with the respective gears of said cone and thereby to operate said tumbler arm different angular distances for meshing relations of said tumbler gear with the respective gears of said cone by moving said operating handle a single distance.

30. In speed changing mechanism, the combination of a cone of gears, a tumbler arm and a tumbler gear thereon movable axially opposite any selected gear of said cone and movable different angular distances for meshing relation of said tumbler gear with the respective gears of said cone, an operating handle and an operated part operated by said handle and having stepwise connections with said tumbler arm coordinated with the steps of the gears of said cone, whereby said handle is movable a single distance for moving said tumbler arm and said tumbler gear said different angular distances.

31. In speed changing mechanism, the combination of a cone of gears, a tumbler arm and a tumbler gear thereon movable axially opposite any selected gear of said cone, and a lever having its pivot adjacent to the end of larger diameter of said cone and extending lengthwise of said cone, said lever coacting with said tumbler arm cone, at the different axial positions of the latter for moving the latter different angular distances at said different axial positions for meshing relation of said tumbler gear with the respective gears of said cone.

32. In speed changing mechanism, the combination of a pair of shiftable power transmitting elements, a plain lever and a bell crank lever respectively having operative connections with said respective elements for shifting the same, and a single handle having rotative connection with said plain lever and endwise moving connection with said bell crank lever to operate said levers at different lengthwise positions of said handle.

33. In speed changing mechanism, the combination of a pair of shiftable power transmitting elements, a plain lever and a bell crank lever respectively having operative connections with said respective elements for shifting the same, an axially movable and rotative shaft, a collar on said shaft having operative connections with said bell crank lever and movable endwise with said shaft to operate said bell crank lever, locking means to hold said collar non-rotative during such endwise movement and releasable from said collar at the end of such endwise movement for rotative movement of said shaft, a lengthwise stationary collar rotatable with said shaft and having operative connection with said plain lever to operate said plain lever, whereby said respective levers are operable at different axial positions of said shaft, and a single handle for axially and rotatively moving said shaft.

34. In speed changing mechanism, the combination of a cone of gears, a tumbler arm and a tumbler gear on said tumbler arm, a pivoted arm having a pivot crosswise of said cone and pivotally movable lengthwise of said cone and having operative connection with said tumbler arm to translate said tumbler arm into various positions for registry of said tumbler gear with the respective gears of said cone, a lever having its pivot adjacent to the end of larger diameter of said cone and extending lengthwise of said cone and coactive along its length with said tumbler arm at the various registry positions of said tumbler arm, a closed gear box in which all said parts are mounted and a pair of shafts journaled in the closed wall of said gear box, one of said shafts provided with a handle outside said closed gear box and operative connection inside said closed gear box with said pivoted arm, and the other of said shafts provided with a handle outside said closed gear box and operative connection inside said closed gear box with said lever.

35. In combination, a cone of gears and tumbler mechanism, means for transmitting power therethrough in opposite directions and an index of speed resultants obtained thereby comprising a rotatable member, said rotatable member having operative connection with the movable element of said cone of gears and tumbler mechanism to shift said movable element by said rotation for selective speed changes in consonance with the notations of speed resultants of said index.

36. In combination, a cone of gears, an axially shiftable tumbler coacting therewith, an index of speed resultants comprising a rotatable member rotatable for indicating a selected speed resultant and having operative connection with said shiftable tumbler to shift said tumbler by said rotation axially into the speed transmission position relatively to said cone of gears to produce said selected speed resultant, and means to angularly shift said tumbler for power transmission.

37. In combination, a cone of gears and a tumbler coacting therewith forming a pair of transmission members, one of which is axially shiftable, an index of speed resultants comprising a rotatable member rotatable for indicating a selected speed resultant and having operative connection with said axially shiftable transmission member to shift the same by said rotation axially into the speed transmission position relatively to the other of said members to produce said selected speed resultant, and means to angularly shift one of said members for power transmission between said members.

38. In combination, a cone of gears and a coacting tumbler which are selectively driven for power transmission therethrough in opposite directions, a feeding element driven thereby selectively, and supplemental speed reducing means between said tumbler and said feeding element effective when said cone of gears is the driver to lower the register of the range of speeds imparted to said feeding element whereby to more closely relate the ranges of speeds resulting from said power transmissions in opposite directions for placement of notations of resultants of said speeds on an index, and said index having operative connection with said tumbler to shift said tumbler in consonance with given ones of said notations.

39. In combination, a cone of gears and tumbler mechanism, means for power transmission therethrough in opposite directions, a feeding member operated thereby in each of said directions, a speed reducing train between the tumbler portion of the mechanism and said feeding member to substantially equalize the transmitting effects upon said feeding member in both said directions whereby to produce a subtsantially equal range of speed resultants of different kinds, and an index of said speed resultants of different kinds comprising a movable member, said movable member having operative connection with the axially shiftable member of said cone of gears and tumbler mechanism to shift the same in accordance with the notations of said speed resultants of different kinds of said index.

40. In combination, a cone of gears and tumbler mechanism, supplemental speed changing means therefor, means for power transmission in opposite directions through said cone of gears and tumbler mechanism, a feeding member operated thereby in each of said directions, a speed reducing train between the tumbler portion of said mechanism and said feeding member to substantially equalize the transmitting effects upon said feeding member in both said directions whereby to produce substantially equal ranges of speed resultants of different kinds, and an index of said speed resultants of different kinds comprising a movable member, said movable member having operative connection with the axially shiftable member of said cone of gears and tumbler mechanism to shift the same in accordance with the notations of said speed resultants of different kinds of said index.

41. In combination, a cone of gears and a tumbler coacting therewith forming a pair of transmission members, one of which is axially shiftable, means for power transmission therethrough in opposite directions for delivery resultants of different kinds, a power delivering speed qualifying train operated by one of said members to substantially equalize the delivery resultants of both said members, and an index of such plurality of delivery resultants arranged groupwise comprising a rotatable member, said rotatable member having operative connection with said axially shiftable transmission member to shift the same by its rotation in accordance with the notations of such delivery resultants of said index.

42. In combination, a cone of gears and a tumbler coacting therewith forming a pair of transmission members, one of which is axially shiftable, means for power transmission therethrough in opposite directions for delivery resultants of different kinds, a power delivering speed qualifying train operated by one of said members to substantially equalize the delivery resultants of both said members, and an index of such plurality of delivery resultants arranged groupwise with corresponding delivery resultants of each kind in said respective groups, said index comprising a rotatable member, said rotatable member having operative connection with said axially shiftable transmission member to shift the same by its rotation in accordance with the positions of said groups of delivery resultants on said index.

43. In combination, a cone of gears and a tumbler coacting therewith forming a pair of transmission members, one of which is axially shiftable, means for power transmission therethrough in opposite directions for delivery resultants of different kinds, said delivery resultants being based on different speeds of transmission, and an index of such delivery resultants arranged in groups respectively based on different speeds each containing such speed resultants of different kinds, said index comprising a movable member having operative connection with said axially shiftable member to shift the same in accordance with the positions of said respective groups in said index.

44. In combination, a cone of gears and a tumbler coacting therewith forming a pair of transmission members, one of which is axially shiftable, supplemental speed changing means therefor, means for power transmission through said cone and tumbler in opposite directions for delivery resultants of different kinds, said delivery resultants being based on different speeds of transmission, and an index of such delivery resultants arranged in groups respectively based on different speeds each containing such speed resultants of different kinds, said index comprising a movable member having operative connection with said axially shiftable member to shift the same in accordance with the positions of said respective groups in said index.

45. In speed changing mechanism, the combination of a closed casing, a cone of gears, a tumbler arm and a tumbler gear on the latter in said closed casing, operated means in said closed casing to shift said tumbler arm lengthwise of said cone for location of said tumbler gear opposite any gear of said cone, operated means in said closed casing to angularly move said tumbler arm for meshing relation of said tumbler gear with the respective gears of said cone by movement of said operated means a single distance, an operating shaft journaled in the wall of said closed casing for each of said operated means, and operating means outside said casing for each of said operating shafts, whereby to place said cone of gears, tumbler arm and tumbler gear and said operated means wholly inside said closed casing and to operate the same solely by means of operating shafts journaled in the walls of said closed casing.

46. In combination, a cone of gears and a tumbler coacting therewith forming a pair of transmission members, one of which is axially shiftable for speed change, driving means selectively for said cone of gears and said tumbler for power transmission therethrough in opposite directions, a selective speed transmission for said driving means for selective higher and lower transmission speeds thereof, whereby various superposed groups of delivered speeds by said cone of gears and tumbler respectively as drivers are produced, and an index of speed resultants in said respective groups including groups of speed resultants in one of said directions inversely superposed, said index including a rotatable member to indicate said respective groups and having operative connection with said shiftable member to shift the same into the speed transmission position denoted by said respective groups of the indicator.

FRANK A. FRITZSCH.

---

CERTIFICATE OF CORRECTION.

Patent No. 2,149,014. February 28, 1939.

FRANK A. FRITZSCH.

It is hereby certified that error appears in the printed specification of the above numbered patent requiring correction as follows: Page 3, second column, line 54, for the word "ball" read bell; page 5, first column, line 14, for "piston" read pinion; page 11, second column, lines 44, 45, 46 and 47 inclusive, claim 19, strike out "independent of said last-named means and a bar to place said tumbler gear in the plane of any selected gear of said group," and insert instead to place said tumbler gear in the plane of any selected gear of said group, a bar independent of said last-named means and; page 13, first column, line 9, claim 33, for "connections" read connection; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.

members to substantially equalize the delivery resultants of both said members, and an index of such plurality of delivery resultants arranged groupwise with corresponding delivery resultants of each kind in said respective groups, said index comprising a rotatable member, said rotatable member having operative connection with said axially shiftable transmission member to shift the same by its rotation in accordance with the positions of said groups of delivery resultants on said index.

43. In combination, a cone of gears and a tumbler coacting therewith forming a pair of transmission members, one of which is axially shiftable, means for power transmission therethrough in opposite directions for delivery resultants of different kinds, said delivery resultants being based on different speeds of transmission, and an index of such delivery resultants arranged in groups respectively based on different speeds each containing such speed resultants of different kinds, said index comprising a movable member having operative connection with said axially shiftable member to shift the same in accordance with the positions of said respective groups in said index.

44. In combination, a cone of gears and a tumbler coacting therewith forming a pair of transmission members, one of which is axially shiftable, supplemental speed changing means therefor, means for power transmission through said cone and tumbler in opposite directions for delivery resultants of different kinds, said delivery resultants being based on different speeds of transmission, and an index of such delivery resultants arranged in groups respectively based on different speeds each containing such speed resultants of different kinds, said index comprising a movable member having operative connection with said axially shiftable member to shift the same in accordance with the positions of said respective groups in said index.

45. In speed changing mechanism, the combination of a closed casing, a cone of gears, a tumbler arm and a tumbler gear on the latter in said closed casing, operated means in said closed casing to shift said tumbler arm lengthwise of said cone for location of said tumbler gear opposite any gear of said cone, operated means in said closed casing to angularly move said tumbler arm for meshing relation of said tumbler gear with the respective gears of said cone by movement of said operated means a single distance, an operating shaft journaled in the wall of said closed casing for each of said operated means, and operating means outside said casing for each of said operating shafts, whereby to place said cone of gears, tumbler arm and tumbler gear and said operated means wholly inside said closed casing and to operate the same solely by means of operating shafts journaled in the walls of said closed casing.

46. In combination, a cone of gears and a tumbler coacting therewith forming a pair of transmission members, one of which is axially shiftable for speed change, driving means selectively for said cone of gears and said tumbler for power transmission therethrough in opposite directions, a selective speed transmission for said driving means for selective higher and lower transmission speeds thereof, whereby various superposed groups of delivered speeds by said cone of gears and tumbler respectively as drivers are produced, and an index of speed resultants in said respective groups including groups of speed resultants in one of said directions inversely superposed, said index including a rotatable member to indicate said respective groups and having operative connection with said shiftable member to shift the same into the speed transmission position denoted by said respective groups of the indicator.

FRANK A. FRITZSCH.

---

CERTIFICATE OF CORRECTION.

Patent No. 2,149,014.  February 28, 1939.

FRANK A. FRITZSCH.

It is hereby certified that error appears in the printed specification of the above numbered patent requiring correction as follows: Page 3, second column, line 54, for the word "ball" read bell; page 5, first column, line 14, for "piston" read pinion; page 11, second column, lines 44, 45, 46 and 47 inclusive, claim 19, strike out "independent of said last-named means and a bar to place said tumbler gear in the plane of any selected gear of said group," and insert instead to place said tumbler gear in the plane of any selected gear of said group, a bar independent of said last-named means and; page 13, first column, line 9, claim 33, for "connections" read connection; and that the said Letters Patent should be read with this correction therein that the same may conform to the record of the case in the Patent Office.

Signed and sealed this 4th day of April, A. D. 1939.

Henry Van Arsdale (Seal)  Acting Commissioner of Patents.